(12) United States Patent
Deneys et al.

(10) Patent No.: US 8,703,042 B2
(45) Date of Patent: Apr. 22, 2014

(54) METHOD AND SYSTEM OF REMOVING ACCRETION BUILDUP IN A FURNACE

(75) Inventors: Adrian C. Deneys, Danville, CA (US); Stephen A. Manley, Spring, TX (US); William J. Mahoney, East Aurora, NY (US); Kevin W. Albrecht, Brownsburg, IN (US); Jesse E. Cates, Brownsburg, IN (US); Arsenio C. Enriquez, Jr., West Jordan, UT (US); Kyle Brent Wright, Sandy, UT (US)

(73) Assignee: Praxair Technology, Inc., Danbury, CT (US)

( * ) Notice: Subject to any disclaimer, the term of this patent is extended or adjusted under 35 U.S.C. 154(b) by 283 days.

(21) Appl. No.: 13/154,903

(22) Filed: Jun. 7, 2011

(65) Prior Publication Data

US 2012/0175827 A1    Jul. 12, 2012

Related U.S. Application Data (60) Provisional application No. 61/352,143, filed on Jun. 7, 2010.

(51) Int. Cl.
*C21B 9/10*    (2006.01)

(52) U.S. Cl.
USPC ............................. 266/46; 266/135

(58) Field of Classification Search
USPC ..................... 266/135, 268, 270, 46
See application file for complete search history.

(56) References Cited

U.S. PATENT DOCUMENTS 6,910,431 B2 *    6/2005    Satchell, Jr. ............... 110/347

FOREIGN PATENT DOCUMENTS

| EP | 0 965 649 A1 | 12/1999 |
|---|---|---|
| JP | 7 151474 | 6/1995 |
| JP | 2000 161864 | 6/2000 |

OTHER PUBLICATIONS

Database WPI; Week 198335; Thomson Scientific, London, GB; AN 1983-752133; XP002660547, & SU 969 768 (Heavy Nonferr Metal), Oct. 30, 2982, Abstract (p. 1).

* cited by examiner

*Primary Examiner* — Scott Kastler
(74) *Attorney, Agent, or Firm* — Donald T. Black (57) ABSTRACT

A method and system for method for removing solid accretions from a copper anode or holding furnace using coherent jet lance assembly directed towards the solid accretions in the bottom portion of the copper anode furnace to melt the solid accretions over an extended period of time without damage to the furnace refractory proximate a point of stream impingement.

8 Claims, 9 Drawing Sheets

METHOD AND SYSTEM OF REMOVING ACCRETION BUILDUP IN A FURNACE

CROSS REFERENCE TO RELATED APPLICATIONS

This patent application claims priority to U.S. provisional patent application Ser. No. 61/352,143 filed Jun. 7, 2010, the disclosure of which is incorporated by reference herein.

FIELD OF THE INVENTION

The present invention relates to the removal of hearth accretions from a furnace, and more particularly, to the use a simple and light weight coherent jet lance for the melting and removal of hearth accretions from a copper anode or copper holding furnace.

BACKGROUND

The production of copper typically involves a multi-step procedure which includes concentration, smelting, converting, refining, anode casting and electrolytic refining procedures. Typically, starting with an ore comprising one or more of a copper sulfide or copper-iron-sulfide mineral, such as chalcocite, chalcopyrite and bornite, the ore is converted to a concentrate containing usually between 25 and 35 weight percent copper. The concentrate is then converted with heat and oxygen first to a matte and then to blister copper. The further refining of the blister copper in an anode furnace accomplishes the further reduction of oxygen and sulfur impurities in the blister copper, typically from levels as high as 0.80% and 1.0%, respectively, to levels as low as 0.05% and 0.002%, respectively and is usually carried out in the temperature range of about 1090° C. (2000° F.) to 1300° C. (2400° F.). However, during the anode refining process, solid accretions accumulate in the anode furnace which tends to adversely affect furnace capacity and ultimately copper production.

Furnace accretions are pervasive in both ferrous and non-ferrous pyrometallurgical reactors. Furnace accretions include hearth accretions and wall (or duct) accretions as well as waste heat boiler throat accretions and uptake shaft accretions observed in flash furnaces. Hearth accretions in non-ferrous reactors have been documented in early converter operations and more recently non-ferrous flash furnaces. The mechanism of hearth accretion formation is thought to be a complex phenomenon that includes factors like slag chemistry, oxygen potential, as well as heat and mass transfer mechanisms. Build-up of hearth accretion appears to be related, at least partially, to efforts to extend campaign life of furnaces and selected furnace operational considerations including slag skimming frequency, porous gas injection mixing plug performance and occasional upstream upset conditions.

An example of the adverse effects of hearth accretions was observed at the smelting operations at Kennecott Utah Copper. As a result of the decreasing furnace capacity from normal operating capacity of about 600 tons to a reduced operating capacity of about 400 tons, the copper anode furnaces used at Kennecott Utah Copper were becoming full after only two blister taps from the flash converter and this shorter furnace fill time reduced the time available for scrap melting. Also, the decreased furnace capacity increased the number of refining cycles to meet the desired output of copper production. In all, the smelter anode productivity at the Kennecott facility had been reduced by up to about 20% due to hearth accretions.

Prior efforts to remove the hearth accretion buildup centered on fluxing and using solid fuels to help melt the buildup. For example, ferrosilicon has been used as a fuel in attempts to melt the hearth accretion buildup. In basic oxygen steel-making furnaces hearth accretions are typically removed by charging the furnace with ferrosilicon and burning the ferrosilicon with oxygen supplied through the main oxygen lance. An alternative effort to mitigate or remove the hearth accretion buildup in the furnace is soda ash fluxing, with or without addition of lime and aluminum chips (i.e. thermite reaction). However, the disadvantages associated with fuels such as ferrosilicon and soda ash fluxing, including temperature control and localized heat generation may have adverse effects on the campaign life of the anode furnaces. In particular, because the anode furnace geometry is typically not symmetrical with respect to the oxygen source, there are concerns over temperature control and potential for refractory damage by excess localized heat generation when using fuels such as ferrosilicon and soda ash fluxing.

Another technique to remove the hearth accretion buildup that has previously been used is the addition of significant oxy-fuel burner energy in the vicinity of the accretion buildup to partially melt and loosen the accretion. While this solution has proven effective, there are serious concerns regarding the effects of the oxy-fuel burner on refractory integrity as well as environmental concerns associated with increased emissions associated with the oxy-fuel burner.

Traditional coherent jet technology has also been suggested to address the problem of hearth accretions. One such coherent jet system is Praxair's CoJet® system which provides both chemical energy and gas injection capabilities for metallurgical processes such as copper anode refining process. Briefly, the coherent jet process creates a flame shroud around a high velocity gas jet. The flame shroud reduces ambient gas entrainment into the high velocity jet thereby maintaining the jet's velocity profile over longer distances, compared to an un-shrouded gas jet. The coherent jet technology and system has been shown to be potentially useful in copper anode refining as a source of top-blown oxidation and reduction gas jets for fire refining as well as an energy source for increased scrap melting rates. Scrap melting rates of about 9 tonne/h using the traditional coherent jet technology and systems have been demonstrated in one copper anode furnace at Kennecott Utah Copper, with up to 203 tonne scrap melted during one melting period.

However, some operational concerns and disadvantages of using existing or traditional coherent jet systems need to be overcome if use of coherent jet technology for removal of hearth accretions is to become a commercial practicality. These operational concerns include: opening the coherent jet port often required jack-hammering and mag-lancing; connecting the gas supply hoses to the coherent jet lance assembly required elevated work practices and controls; plugging the coherent jet port was difficult and could result in leaks of molten copper; and, the size and weight of the coherent jet lance assembly devices typically required at least two persons to install and remove.

As discussed in more detail in the sections that follow, the presently disclosed system and method for removal of accretions using a simpler coherent jet lance assembly design has overcome many of these difficulties.

SUMMARY OF THE INVENTION

In one aspect, the present invention may be characterized as a method for the removing solid accretions from an anode furnace comprising the steps of: (a) connecting or disposing at least one coherent jet lance assembly in the furnace, said coherent jet lance assembly being capable of generating a coherent oxygen-fuel gas stream substantially free of nitrogen gas, the coherent oxygen-fuel gas stream comprising a main oxygen gas stream and a surrounding flame envelope of fuel and oxygen gas; (b) directing the coherent oxygen-fuel gas stream from said coherent jet lance assembly towards solid accretions at a firing rate of between about 4 million BTU/hour to about 15 million BTU/hour and with the main oxygen gas stream having an axial velocity of between about 75 to about 500 feet per second; and (c) disconnecting or removing the coherent jet lance assembly from the anode furnace; and (d) rotating the anode furnace to remove any melted accretions from the anode furnace via a port. The flame length of the coherent oxygen-fuel gas stream is sufficient to melt solid accretions within the furnace yet does not impinge the refractory wall.

In another aspect, the present invention may be characterized as a system for the removal of solid accretions from an anode furnace comprising: a furnace having a bottom portion where solid accretions tend to build-up and a top portion, the furnace having a refractory wall and containing one or more sealable ports in the top portion of the furnace; at least one coherent jet lance assembly mounted in the top portion of the furnace and directed at solid accretions in the bottom portion of the furnace, the coherent jet lance assembly connected to sources of oxygen-containing gas, inert gas, and fuel; and a gas control system operatively coupled to the coherent jet lance assembly and said sources of oxygen-containing gas, inert gas, and fuel. The gas control system is adapted for controlling the supply of said gases to the coherent jet lance assembly to produce a coherent oxygen-fuel gas stream comprising a main oxygen containing gas stream and a surrounding flame envelope at a firing rate of between about 4 million BTU/hour to about 15 million BTU/hour and with the main oxygen containing gas stream having an axial velocity of between about 75 to about 500 feet per second and wherein the flame length of the coherent oxygen-fuel gas stream is sufficient to melt solid accretions in the bottom portion of the furnace without impingement on the refractory wall.

BRIEF DESCRIPTION OF THE DRAWINGS

The above and other aspects, features, and advantages of the present invention will be more apparent from the following, more detailed description thereof, presented in conjunction with the following drawings, wherein:

FIG. 4A is an isometric view of a prior art coherent jet lance assembly disposed within a water cooled housing, whereas

FIG. 5A depicts the prior art coherent jet lance assembly installed and operating on a copper anode furnace, whereas

DETAILED DESCRIPTION

As used herein, the term "coherent gas stream" or "coherent jet" means a gas stream which has little or no increase in jet diameter in the radial direction and which retains its axial velocity over a significant distance from the face of the jet nozzle. Such jets are formed by ejecting a gas jet through a converging/diverging nozzle and surrounding the same with a flame envelope that extends over at least a portion of the jet length, and preferably over the entire length of the jet. Similarly, the term "flame envelope" means a combusting flow formed by the combustion of a fuel and an oxidant which extends along one or more gas streams.

In a broad sense, the presently disclosed system and method relates in general to the application of coherent jet technology for the removal of solid accretions in a furnace during the refining of non-ferrous metals. While the preferred embodiments relate particularly to accretions created during the anode refining of molten copper, certain aspects and features of the present systems and methods are equally applicable to the smelting and refining of other non-ferrous metals such as nickel, lead, zinc and tin. It is understood that there may be various amounts of ferrous metal in the melt of the non-ferrous metal refined using the techniques disclosed herein. The disclosed system and method are particularly useful for removal of solid accretions in the copper anode furnace.

As discussed above, the coherent jet technology involves injecting gases in the form of coherent gas jets at high velocities to achieve superior process benefits compared to conventional gas injection techniques in pyrometallurgical refining of non-ferrous metals. Specially designed gas injection nozzles keep the gas stream jet coherent. Coherent means preserving the jet diameter and velocity. The coherent jet delivers precise amounts of the gas stream toward the solid accretions with higher momentum, better impingement, less divergence or decay, less entrainment of ambient furnace gases. More importantly, application of the coherent jet to melt the solid accretions is done without seriously compromising the refractory integrity or adversely shortening the campaign life of the furnace.

Figure 1:
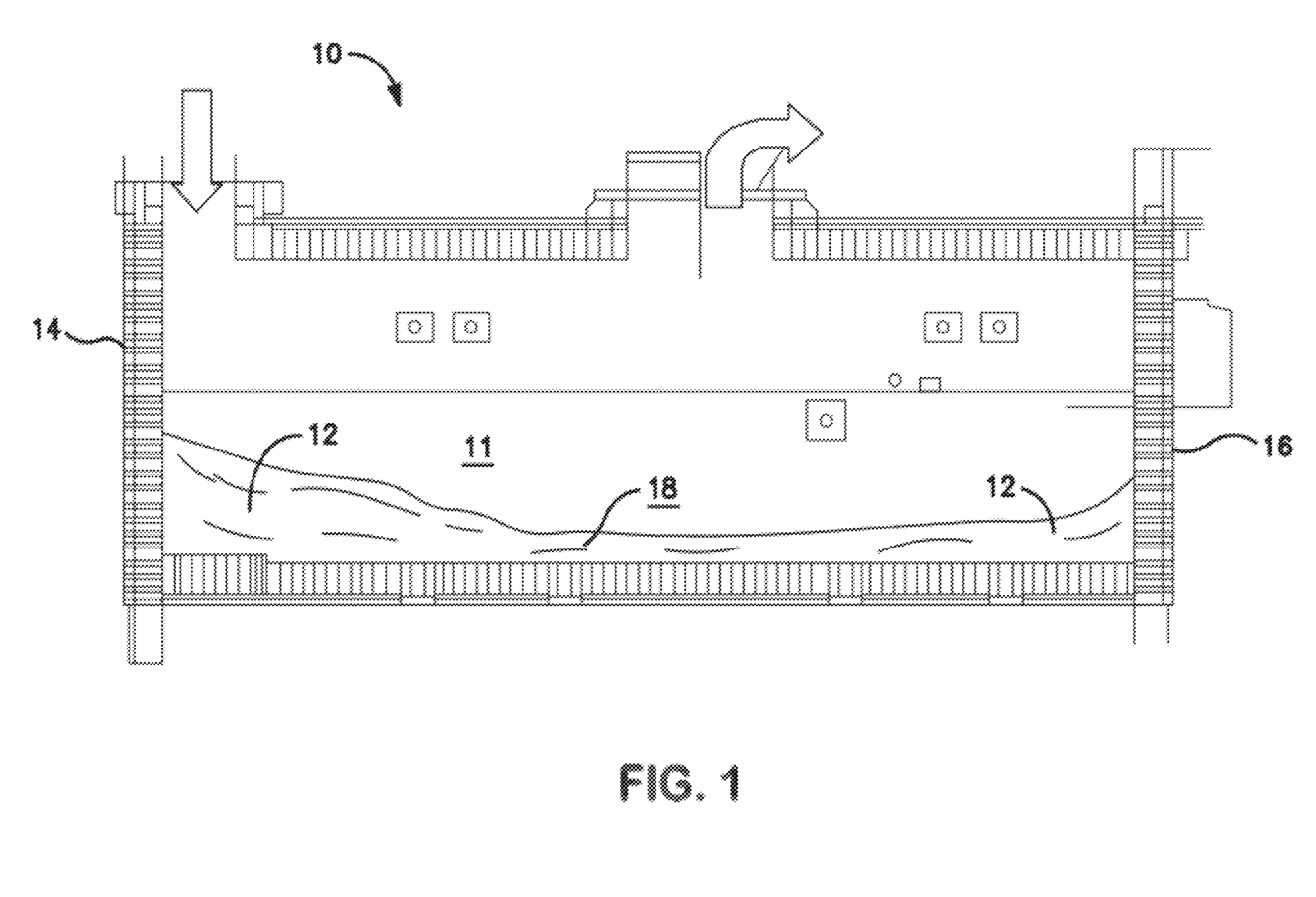
FIG. 1 is a cut-away illustration of a copper anode furnace depicting solid accretion build-up.

Turning now to FIG. 1, there is shown a cut-away illustration of a copper anode furnace 10 of the type installed at the Kennecott Utah Copper facility. Visual inspection of the interior 11 of the copper anode furnace 10 showed that hearth accretion build-up 12 is typically largest proximate the copper feed end 14 of the furnace 10. There is also a build-up of accretion 12 proximate the burner end 16 of the furnace 10 while the accretion build-up 12 is thinnest at the central section 18 or central region of the furnace 10.

Figures 2A, 2B:
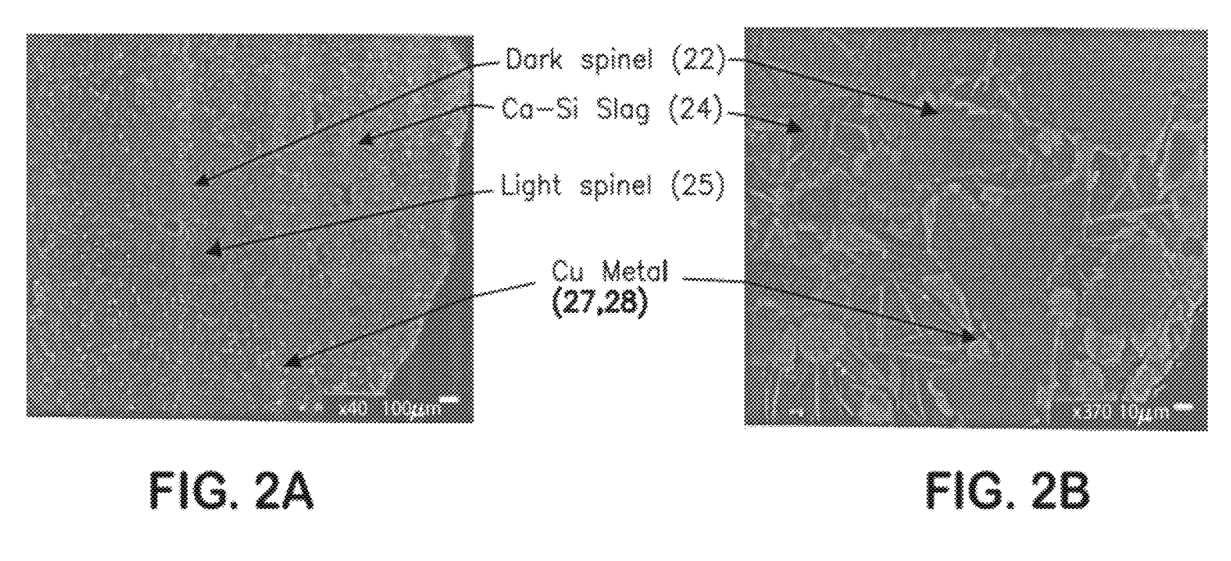
FIGS. 2A and 2B are magnified images of polished accretion samples identifying the various phases of the accretions.

Characterization of the accretion build-up in the anode furnace was performed by taking samples obtained using a pipe driven into the hearth accretion. The accretion samples typically consisted of a copper-rich portion, and a copper deficient portion. The copper deficient phase was deemed to be representative of the mass of build-up inside the furnace. Polished accretion samples at 40× and 370× magnification are shown in FIGS. 2A and 2B. As seen therein the phases present in the accretion samples are predominately dark spinel 22 with a moderate amount of Ca—Si slag 24 (i.e. Ca, Si, Al, Fe, Cu oxide). Other phases also present in the accretion in relatively minor amounts include: light spinel 25 (i.e. Fe, Cu oxide); Cu—Fe oxide 26 (i.e. $Cu_2O:Fe_2O_3$); high Cu phase 27 (i.e. Cu and $Fe_2O_3$); and Cu metal phase 28 (i.e. 98% Cu).

Electron Probe Micro-Analysis (EPMA) was used to identify the various phases present, and approximate the volumes of each phase within the accretion samples. As shown in Table 1 below, the predominant phase of the hearth accretion was dark spinel, a magnetite rich spinel phase with other spinel stabilizing minor components and the accretion also comprised a secondary component of a light spinel and some calcium-silicate also present.

TABLE 1

Samples of the Accretion Build-Up.

| Phase | Amount | Description |
| --- | --- | --- |
| Dark Spinel | 75% | Fe, Mg, Cr, Cu oxide |
| Ca—Si Slag | 20% | Ca, Si, Al, Fe, Cu oxide |
| Light Spinel | Minor | Fe, Cu oxide |
| Cu—Fe Oxide | Minor | 1:1 Cu2O, Fe2O3 |
| High Cu Phase | Minor | 85% Cu, Fe oxide |
| Cu Metal | Minor | 98% Cu |

There are numerous factors that contribute to the problem of solid accretion build-up within a copper anode furnace including composition of new charges; process temperatures, process cycle times, etc. Whatever the cause, accretion build-up inside the anode furnace contributes directly to decrease in copper production over time since the accretion build-up effectively reduces the volume of the furnace available for copper production. Moreover, there is not much time between tapping of the molten copper from the furnace for casting and receiving new charges of blister copper and/or scrap copper within the furnace to mitigate the problem of accretion build-up with traditional means.

Figure 3:
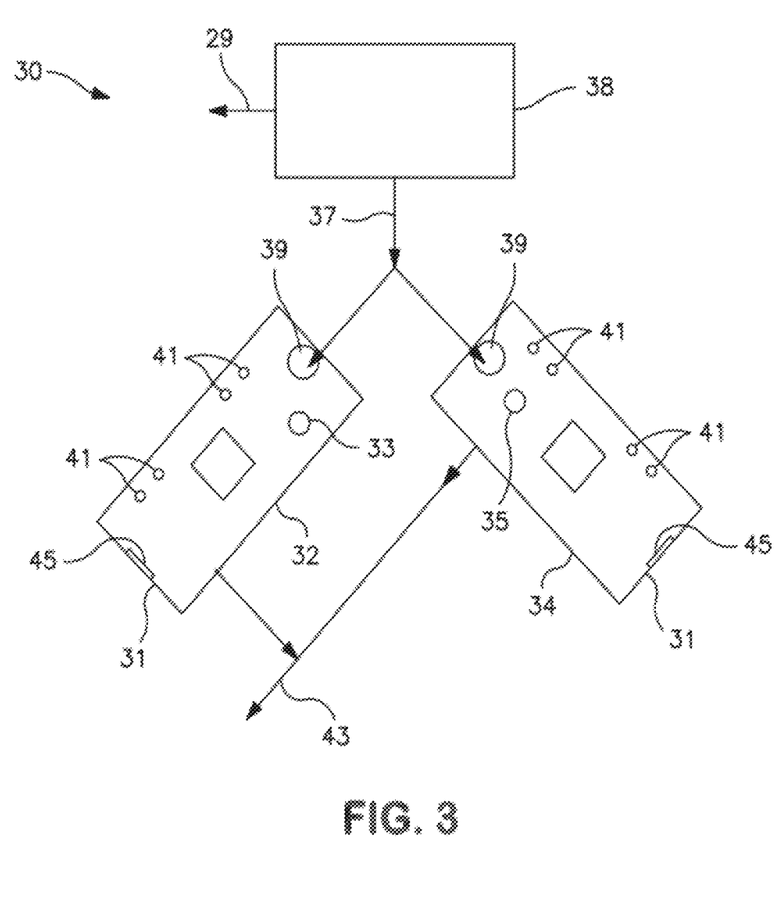
FIG. 3 is schematic illustration of a portion of the copper anode refining process, including the anode furnaces, used at the Kennecott Utah Copper facility.

Depicted in FIG. 3 is a schematic illustration of the anode furnaces 30 at the Kennecott Utah Copper facility. The first anode furnace 32 is shown as having a single coherent jet lance port 33 whereas the second anode furnace 34 is shown as adapted to have one or more coherent jet lance ports 35 and 36. After removal of slag, the blister copper 37 from the flash converter 38 is feed into the copper anode furnaces via the feed port 39 where the blister copper 37 undergoes much of the fire refining process, including oxidation and reduction steps. The end burners disposed at one end 31 of each copper anode furnace away from the feed port 39 are used in the fire refining process. Oxidation and reduction process steps are applied to the molten copper within the anode furnace equipped with tuyeres 41 to introduce the appropriated gases to the molten copper during the refining process. Off gases are typically vented or escape via the feed ports 39. Upon completion of the fire refining process within each anode furnace, the furnace is rotated so as to tap the molten copper from the anode furnace 32, 34 to the casting process 43. Upon emptying the anode furnace the build-up of the accretions within the anode furnace is exposed.

Figure 4A:
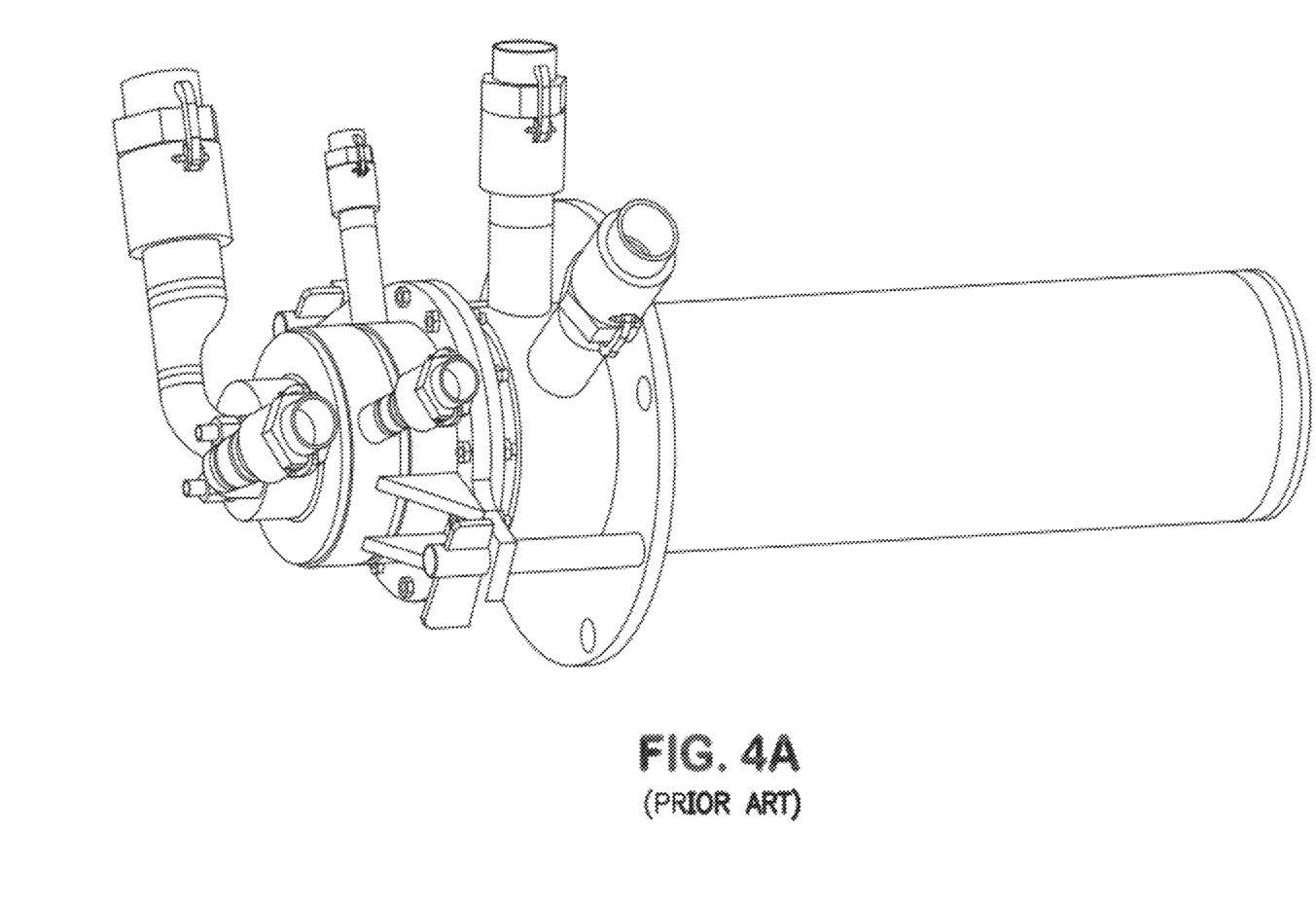

FIG. 4A shows an isometric view of a prior art coherent jet lance assembly disposed within a water cooled housing. The prior art coherent jet lance assembly has a footprint of about 37 inches in length and maximum span or diameter of about 16 inches. The prior art coherent jet injector disposed within the water cooled housing has a diameter of about 6 inches and weighs about 200 pounds. The entire coherent jet system with water cooled housing typically weighs nearly 400 pounds.

Figure 4B:
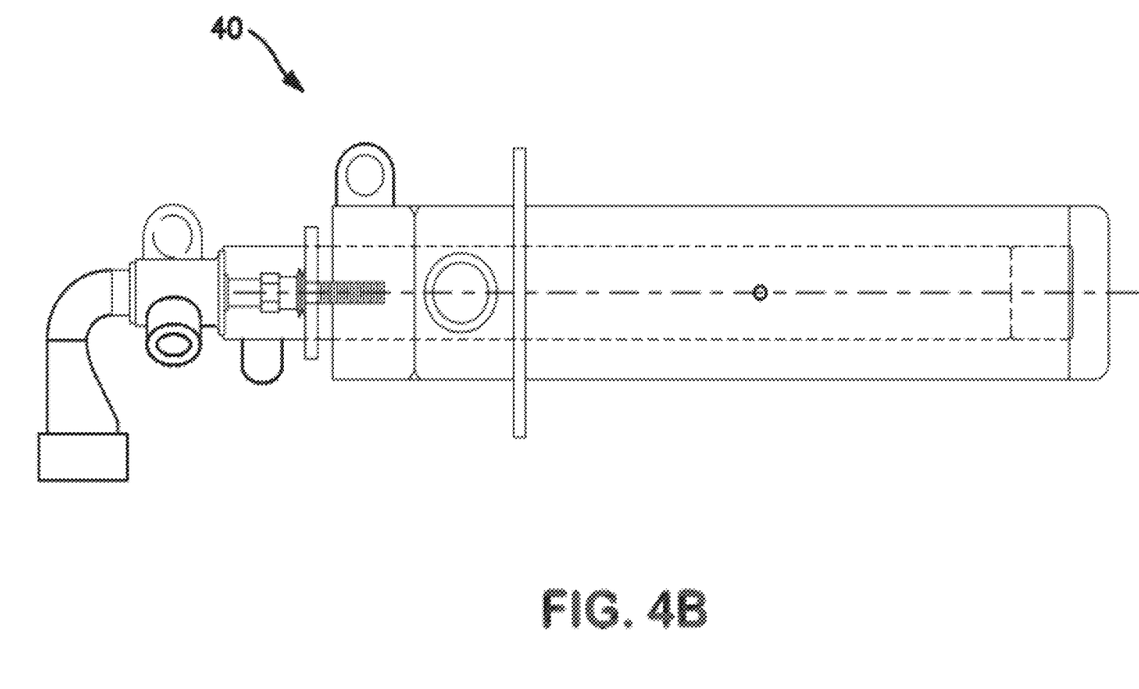
FIG. 4B is a drawing of the simpler, smaller and lighter weight coherent jet lance assembly of the present invention.

In contrast, the simpler, smaller and lighter weight coherent jet lance assembly of the present invention, and shown in FIG. 4B disposed within a water cooled housing, has a footprint of about 37 inches in length but a maximum diameter of only about 7 inches. The slimmer coherent jet injector has a diameter of only about 3.5 inches and the entire coherent jet system weighs about half as much as the prior art device shown in FIG. 4A. This smaller and slimmer coherent jet lance assembly allows for smaller ports in the upper portion of the furnace vessel for easier and safer plugging.

The mounting location for the present coherent jet lance assembly is preferably adjacent to an existing platform or walkway such that no elevated work practices are required for access to the coherent jet lance assembly. This arrangement represents a major improvement from an operability point of view.

The lighter weight of the present coherent jet lance assembly together with the above-described mounting location provides for markedly easier removal and installation of the coherent jet lance assembly within the anode furnace. The smaller diameter ports are generally easier to open and easier to plug which minimizes the safety risks associated with spills.

Figure 5A:
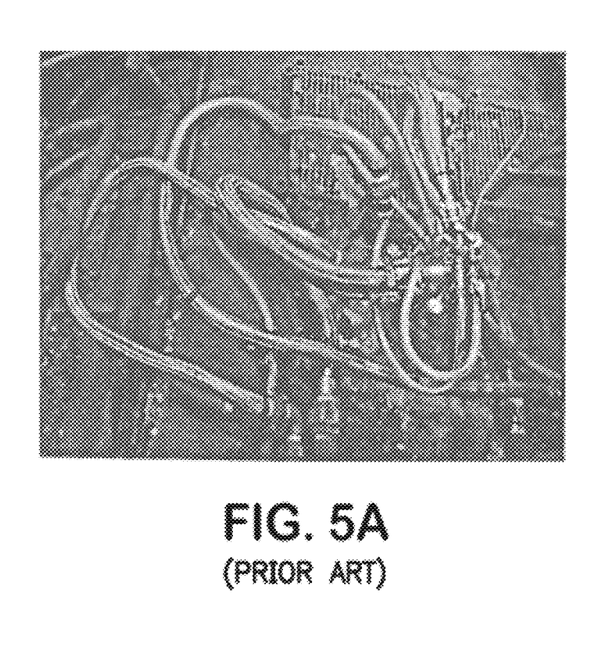
Figure 5B:
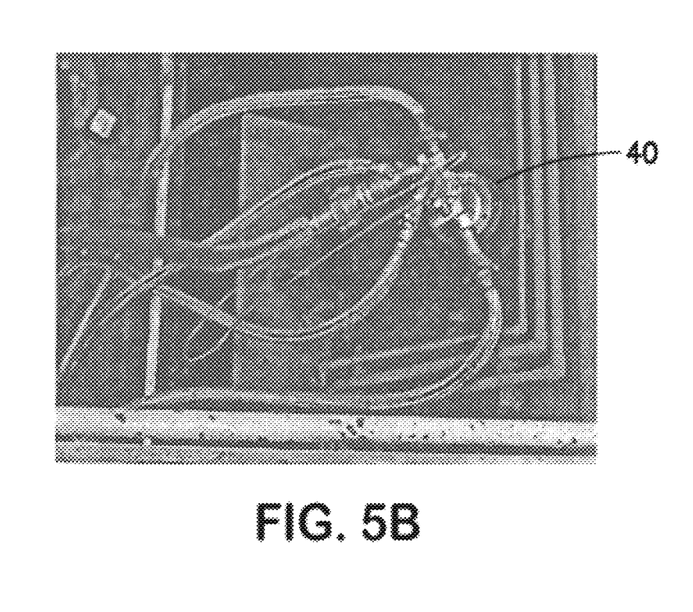
FIG. 5B depicts the present coherent jet lance assembly installed and operating on a copper anode furnace.

The present coherent jet lance assembly also has a simpler arrangement for connecting flexible gas supply hoses. The disclosed flexible gas supply hoses are easily separated and able to be spaced apart from the furnace shell. These differences are highlighted when visually comparing FIG. 5A, which shows the prior art coherent jet lance assembly installed and operating on a copper anode furnace at the Kennecott Utah Copper facility with the present coherent jet lance assembly installed and operating on a copper anode furnace also at the Kennecott Utah Copper facility, shown in FIG. 5B. While simpler in design, each of the present coherent jet lance assemblies is still capable of delivering up to 18 MMBtu/h to the copper anode furnace.

Anytime one considers the use of a coherent jet lance assembly in a furnace, the integrity of the furnace structure and, in particular the integrity of the refractory characteristics on the interior furnace surface remains an issue. By using a smaller coherent jet lance and assembly together with the smaller lance ports, the structural and refractory problems associated with the coherent jet technology are minimized and the production as well as the cost benefits of hearth accretion removal exceeds the risks and concerns associated with maintaining furnace integrity and reducing furnace life due to the integration of the coherent jet assembly with the furnace.

Figure 6:
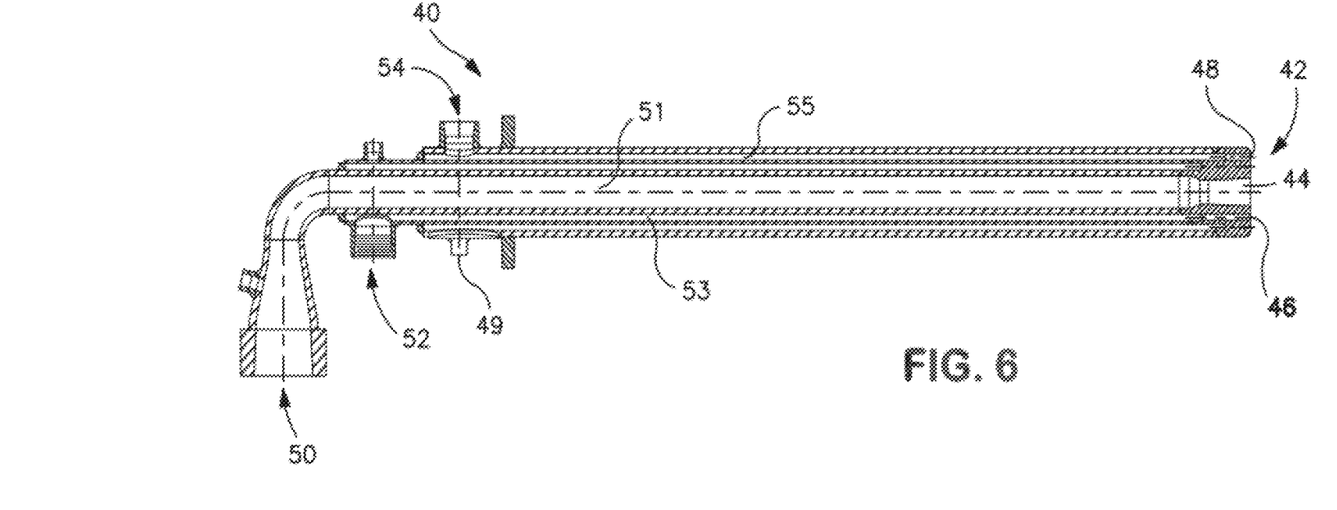
FIG. 6 is a cross-sectional end view of a coherent jet lance assembly in accordance with an embodiment of this invention.
Figure 7:
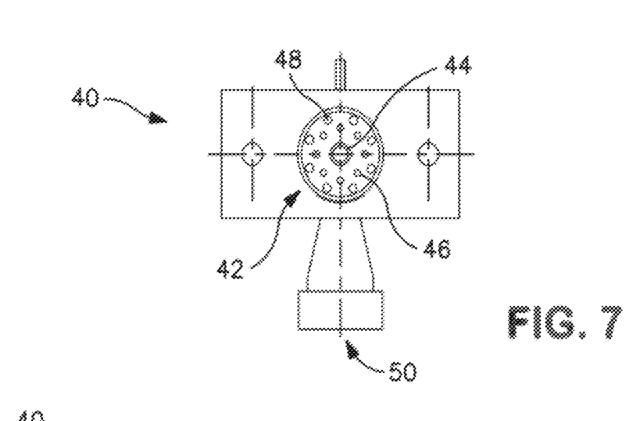
FIG. 7 is a cross-sectional longitudinal view of the coherent jet lance assembly of FIG. 6.

Referring now to FIGS. 6 and 7, there is illustrated a preferred coherent jet lance for accretion removal, generally indicated at 40, comprising a lance face 42 having centrally disposed therein about its radial midpoint a main nozzle 44 surrounded by a concentric rings of fuel and oxidant ports 46 and 48. Although not shown in FIGS. 6 and 7, the coherent jet lance assembly is contained in a water-cooled jacket housing and are themselves water-cooled by a flexible hose from the water jacket to the water connection 49.

In the preferred embodiment, the secondary fuel is preferably natural gas and the secondary oxidant is an oxygen-containing gas such as industrial pure oxygen. Preferably, each of the secondary ports 46 and 48 are disposed in an annular recess within the water cooled housing in order to minimize any blocking of the secondary ports. The primary gas nozzle 44 is a high velocity converging-diverging nozzle appropriately sized in view of the gases and gas flows expected to be delivered with the coherent jet device. Nozzle 44 is preferably connected on its upstream end to a source of an oxygen-containing gas via a first passageway. While FIGS. 6 and 7 illustrate the simple and preferred nozzle design, alternative nozzle configurations may be employed if desired. For example, dual primary gas nozzles may be employed with multiple gas sources in lieu of a single central nozzle. Also, in lieu of the two concentric ring design surrounding the primary or main nozzle as shown in FIGS. 6 and 7, an alternate lance design may involve a single ring of alternating fuel and oxygen-containing gas ports surrounding the primary or main nozzle or perhaps a design using three or more concentric rings.

Another key advantage of using coherent jet technology for accretion removal is the ability to use the coherent jet technology to perform multiple functions during the copper refining process. One such use of the present coherent jet lance assembly that has been demonstrated is the ability to rapidly heat the molten copper bath within the copper anode furnace. This multi-use capability enables the furnace operators to recover bath temperature quickly in the event of a cold blister tap or adverse condition with the end-wall burner.

For example, if the copper blister is tapped at a temperature below 1193° C. (2180° F.) the operator typically needs to run the end-wall burner at a higher firing rate to increase bath temperature. Typical end-wall burners have a firing rate between about 6 MMBtu/h to 13 MMBtu/h using natural gas with oxygen. This energy transfer is only capable of heating the liquid copper within the furnace at a rate of about 6° C. (10° F.) per hour. The actual temperature increase of the liquid copper increase depends on many other factors and furnace operating conditions such as slag layer thickness, end-wall burner tip condition, and also impacts on freeboard refractory. By comparison, the presently disclosed coherent jet lance assembly is capable of a 9 MMBtu/h natural gas firing rate and when two coherent jet lance assemblies are used on an anode furnace, the system is capable of heating the molten copper at around 17° C. to 33° C. per hour (30 to 60° F. per hour).

Still other refining functions can be enhanced using the coherent jet technology in the anode furnace, including, for example supplemental scrap melting, oxidation, and reduction of the copper melt. As the anode furnace is equipped with coherent jet ports and with easy to remove and install coherent jet lance assemblies, the operators can use the existing lance assemblies or swap out with other lance assemblies to provide additional flexibility during the refining process. Such contemplated uses are described in more detail below.

A significant feature of any of the contemplated lance assembly designs is that such lances are low weight, slim but capable of delivering both conventional (soft blown) and coherent (hard blown) gas jets and which are capable of being operated to produce a copper melting flame and coherent gas streams surrounded by flame envelopes. As used herein, a "copper melting flame" refers to a soft blown, non-lancing flame (also referred to as a "bushy flame" in the oxy-fuel burner art) having broad surface coverage. Such flames are produced by adjusting the flows of fuel (preferably natural gas), oxidant (preferably oxygen-containing gas), main oxygen-containing gas stream and optionally an inert gas stream such that a flame is produced which spreads in the radial direction. As the name implies, such flames are employed preferably for the melting of solid copper and other charge materials such as copper scrap, since they provide a large amount of heat over a large surface area for melting the charge material. In the present embodiments, the gas streams used during such solid copper melting and scrap melting are preferably nitrogen free gas flows.

Preferably, in the generation of copper melting flames, the flow of gas to the primary gas nozzles 44 is throttled back from high flow, high velocity conditions to a reduced flow which is at least sufficient to prevent clogging of the nozzles (referred to herein as a "purge flow"), although if desired, high velocity gas flow through the nozzle 44 may be continued, but without the formation of a flame envelope, to produce a hybrid melting/lancing flame. This type of hybrid flame may have an advantage where a combined melting/cutting functionality is desired, such as for example, when solid copper scrap is employed as part of the charge material. The present system and methods contemplate the use of both bushy and hybrid flames, and the same are subsumed under the general term "melting flame". Useful fuels for use herein include hydrocarbon fuels, such as natural gas. Useful oxidants include oxygen-containing gas and preferably industrial grade high-purity oxygen. Preferably, the flows of natural gas and oxygen-containing gas are adjusted so that the total flow of natural gas and oxygen-containing gases are split between the primary nozzle 44 and the secondary ports 46 and 48.

The present coherent jet system also includes a gas control system (also referred to as a gas skid or valve train) that receives gases from header pipes, regulates the gas flows using a micro-processor based PLC controller, and delivers precisely metered gas flows to at least one coherent jet injection lance assembly coupled to the anode furnaces. The actual gas flows are dictated by the operating and the process being carried out mode (e.g. accretion removal, cold blister heating, etc.). Selection of the pre-programmed operating modes and detailed process steps employed by the coherent jet system are preferably made by the anode furnace operators via a touch screen human machine interface in a control room or control station.

Ranges of typical gas flows and firing rates useful in the accretion removal process are provided in Tables 2 and 3 below. As contemplated therein, the gas flows of oxygen and fuel should include an excess flow of fuel above a stoichiometric flow such that the gas provides a reducing effect on the highly oxidized accretion (e.g. spinel) as the flame impinges the solid accretion. The preferred range of excess fuel is between about 5% excess fuel to about 17% excess fuel. Also, in the preferred operating mode of the coherent jet lance assembly for accretion removal, between about 70% to 80% of the oxygen is delivered to the central or primary nozzle with the balance of oxygen delivered to the concentric ring of secondary ports forming the shroud.

TABLE 2

| Preferred Ranges of Coherent Jet Gas Flows | | | | | | |
|---|---|---|---|---|---|---|
| Fuel (Natural Gas) flow (ft³/hour) | 4000 | 6000 | 8000 | 10000 | 12000 | 15000 |
| Total oxygen flow (ft³/hour) | 7619 | 11429 | 15238 | 17391 | 20870 | 26087 |
| Percentage oxygen to main nozzle | 70% | 75% | 80% | 70% | 75% | 80% |
| Oxygen flow to main nozzle (ft³/hour) | 5333 | 8571 | 12190 | 12174 | 15653 | 20870 |

TABLE 2-continued

| Preferred Ranges of Coherent Jet Gas Flows | | | | | | |
|---|---|---|---|---|---|---|
| Oxygen flow to shroud (ft³/hour) | 2286 | 2858 | 3048 | 5217 | 5217 | 5217 |
| Ratio O₂/Fuel (Natural Gas) | 1.90 | 1.90 | 1.90 | 1.74 | 1.74 | 1.74 |
| Excess fuel (%) | 5% | 5% | 5% | 15% | 15% | 15% |

TABLE 3

Coherent Jet Gas Flows @ 75% $O_2$ Flow to Main Nozzle & 5% Excess Fuel

| Burner Firing Rate (MMBtu/hr) | Main Nozzle $O_2$ Flow (ft³/hour) | Shroud $O_2$ Flow (ft³/hour) | Total $O_2$ Flow (ft³/hour) | Shroud $O_2$ Velocity (ft/sec) | Natural Gas Flow (ft³/hour) | Natural Gas Velocity (ft/sec) |
|---|---|---|---|---|---|---|
| 4  | 5714  | 1905 | 7619  | 109 | 4000  | 229 |
| 5  | 7143  | 2381 | 9524  | 137 | 5000  | 287 |
| 6  | 8571  | 2857 | 11429 | 164 | 6000  | 344 |
| 7  | 10000 | 3333 | 13333 | 191 | 7000  | 402 |
| 8  | 11429 | 3810 | 15238 | 219 | 8000  | 459 |
| 9  | 12857 | 4286 | 17143 | 246 | 9000  | 516 |
| 10 | 14286 | 4762 | 19048 | 273 | 10000 | 574 |
| 11 | 15714 | 5238 | 20952 | 300 | 11000 | 631 |
| 12 | 17143 | 5714 | 22857 | 328 | 12000 | 688 |
| 13 | 18571 | 6190 | 24762 | 355 | 13000 | 746 |
| 14 | 20000 | 6667 | 26667 | 382 | 14000 | 803 |
| 15 | 21429 | 7143 | 28571 | 410 | 15000 | 860 |

As seen in Table 3 above, the exit velocities of oxygen gas range from 109 feet per second to about 410 feet per second for flow conditions involving 75% oxygen flow to the primary nozzle and 25% of oxygen flow to the secondary ports or shroud together with about 5% excess fuel. Adjusting the relative oxygen flow to about 70% oxygen flow to the primary nozzle and 30% of oxygen flow to the secondary ports or shroud results in exit velocities approaching 500 feet per second. On the other hand, increasing the excess fuel to 17% and providing a relative oxygen flow of about 80% oxygen flow to the primary nozzle and 20% to the secondary ports or shroud at a natural gas firing rate of 4 MMBTU/hr yields an exit velocity as low as about 75 feet per second. Similar calculations demonstrate a total oxygen flow of between about 6900 cubic feet per hour to nearly 30000 cubic feet per hour for maximum firing rate of about 15 MMBTU/hr.

Controlling the percentage of excess fuel; the ratio of oxygen flow between main nozzle and shroud; and the burner firing rate allows the operator to optimize the accretion removal in view of form of accretion and the time available for accretion removal while minimizing adverse effects to the refractory that may be caused by the coherent jet. Ideally the flame length should not exceed about 7 to 9 feet in length so as to not impinge on the furnace hearth refractory opposite the lance assembly. The flame length and exit velocities are is preferably controlled by adjusting the firing rate of the coherent jet burner and corresponding oxygen and fuel gas flows. The amount of excess fuel used in the present system may very well depend on the characterization of the quantity and phases in the solid accretions. As many of the phases within the accretion are highly oxidized compounds, the reducing effect of the fuel-rich coherent jet is likely to impact the reactions occurring during the melting of the solid accretion. The benefit of using the higher ratios of oxygen flow through the main nozzle is that there is significantly less heat transfer to the lance assembly water-cooled jacket which mitigates the impact of heat to the refractory proximate the lance and allows for smaller and simpler water-cooled jacket design surrounding the lance assembly.

EXAMPLES

Accretion Removal Process

In the preferred method of accretion removal, the present coherent jet lance assembly is installed into the furnace ports allocated to the coherent jet technology after the end of the cast. Once installed, the coherent jet lance assembly is fired in the general direction of the hearth accretion build up for several hours to melt the solid accretion. The actual time allocated to the melting is very much dependent on time available for accretion removal before the copper production in the furnace resumes.

The coherent jet lance assembly firing rate during the accretion removal examples was selected to minimize the potential for refractory wear at the port. In particular, a conservative firing rate profile was developed to remove accretion over an extended period, operating the system for several hours per day. Typically the coherent jet lance assembly was fired at rates between about 4 MMBTU/hr to about 15 MMBTU/hr using natural and oxygen, and could be set as high as 18 MMBTU/hr. It is important to control the firing rate and flame length coming from the coherent jet lance assembly in that adding too much energy with too long a flame could damage refractory at the point of flame impingement. After melting the accretion, the molten accretion is then tapped from the furnace via the furnace mouth a tap port or other exit port.

Figure 8:
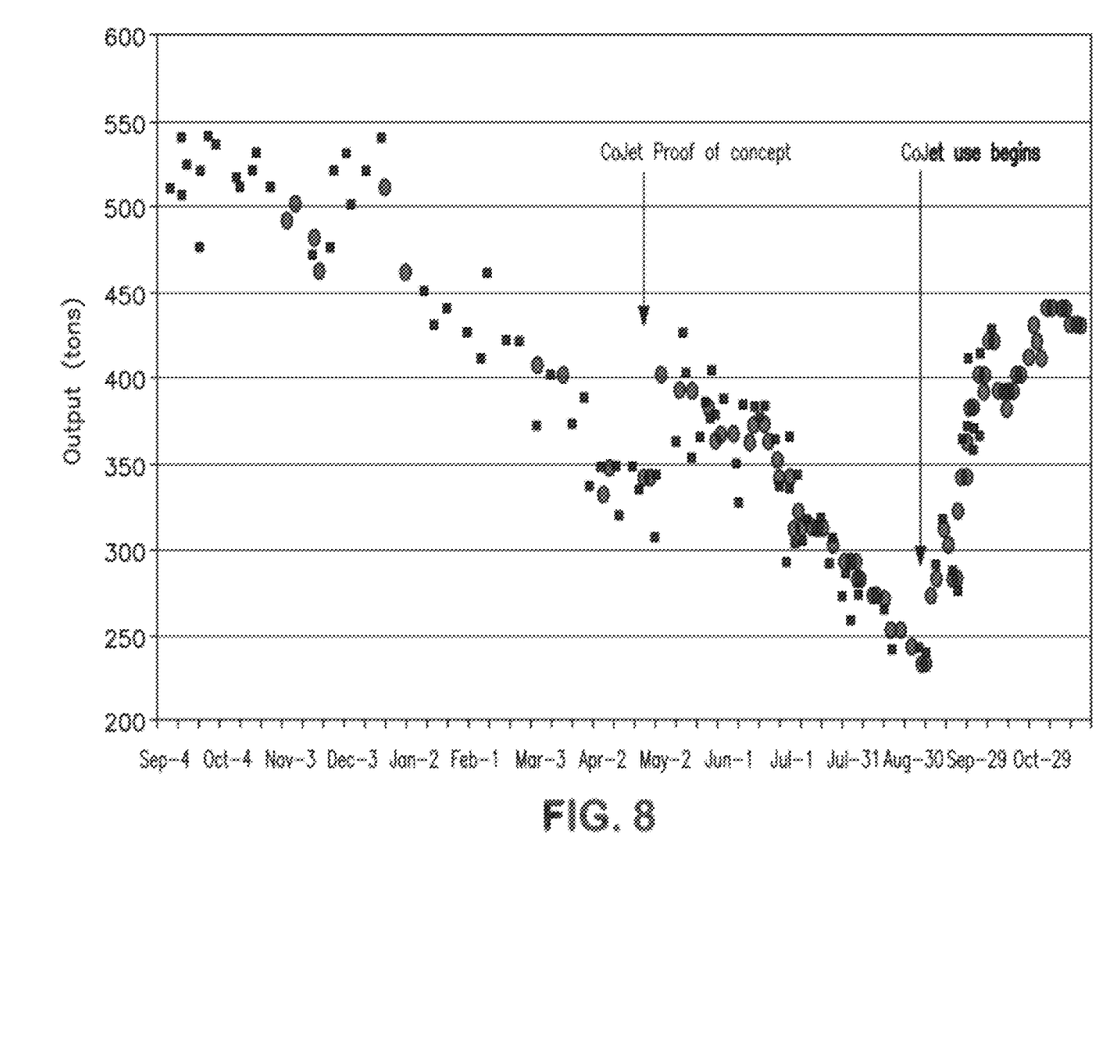
FIG. 8 is a graph that shows anode furnace output measured in tons of copper as a function of time between September 2008 and November 2009 for a first copper anode furnace at Kennecott Utah Copper facility.
Figure 9:
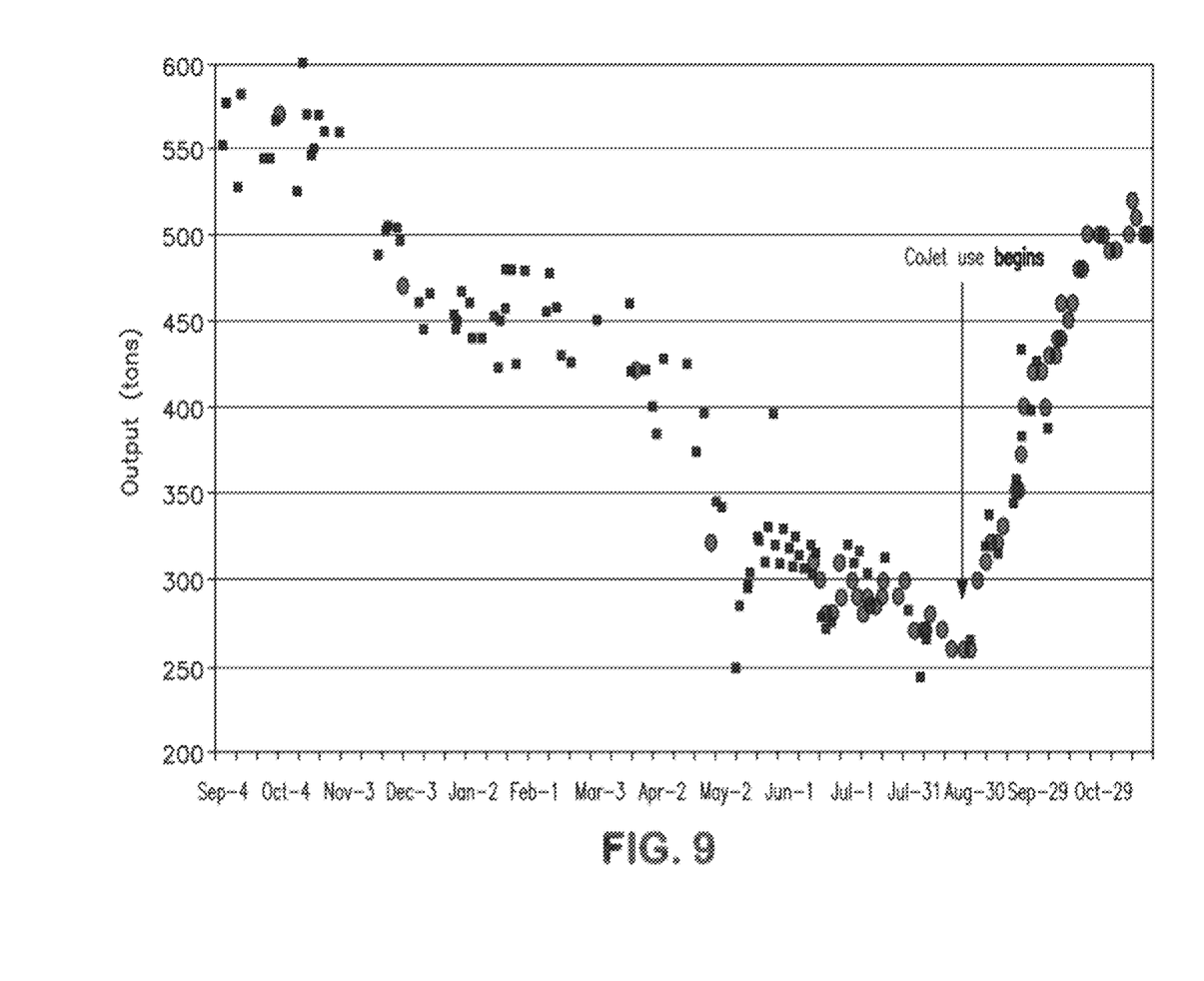
FIG. 9 is a graph that shows anode furnace output measured in tons of copper as a function of time between September 2008 and November 2009 for a second copper anode furnace at Kennecott Utah Copper facility (graph).

Turning now to FIGS. 8 and 9, there is shown graphs of furnace output for two anode furnaces at Kennecott Utah Copper measured in tons of copper output as a function of time between September 2008 and November 2009.

As seen in FIG. 8, the copper output from the first anode furnace decreased from about 520 tons in September 2008 to less than 250 tons in August of 2009 during which time little or no accretion removal was attempted. This significant decrease in production is mainly due to the build-up in solid accretions within the anode furnace. The rate of decreased copper production shown in FIG. 8 highlights the commercial importance of removing the solid accretions. A prototype of the coherent jet based system and method for accretion removal in an anode furnace was initially tested around Sep. 3, 2009. From that point forward, the copper production greatly improved to levels near 450 tons of copper production while the present system and method for accretion removal was used.

Similarly, as seen in FIG. 9, the copper output from the second anode furnace decreased from about 570 tons in September 2008 to only about 250 tons in August of 2009. Again, this significant decrease in production is mainly due to the build-up in solid accretions within the anode furnace. The rate of decreased copper production shown in FIG. 8 highlights the commercial importance of removing the solid accretions. A prototype of the coherent jet based system and method for accretion removal in an anode furnace was initially tested around Sep. 3, 2009. From that point forward, the copper production greatly improved to levels above 500 tons of copper production so long as the coherent jet based system and method for accretion removal was used.

The use of coherent jet technology for accretion removal provides a foundation for using the coherent jet technology for other refining process steps, including melting, slag skimming, oxidation, reduction and casting.

For example, melting of the charge may be carried out through the heat generated by the coherent jet lance assembly at a temperature and for a length of time sufficient to produce and maintain a melt temperature of about 1200° C. to 1250° C. For this purpose, gas flows to the coherent jet lance assembly would include oxygen and fuel and would preferably be substantially nitrogen free. Control of the gas flows would be adjusted to provide a melting flame which is ejected from the coherent jets lance assembly(s) into the furnace headspace and into contact with the copper charge. The melting flame provides for quick melting of the charge to form the molten copper melt.

Also, after melting of the charge, the resulting copper melt may be top blown with a coherent oxygen gas stream to de-sulfurize the copper melt and oxidize the sulfur present therein to $SO_2$. The coherent oxygen gas stream may comprise up to 100 volume % oxygen with only trace amounts of other gases. The coherent oxygen gas stream typically has an axial velocity of from about 1.0 to 2.5 Mach and is controlled by adjusting the flows of secondary oxygen, fuel (e.g., natural gas) and main oxygen gas stream from main nozzle such that a flame envelope is produced around the main oxygen stream for at least a portion of the length of the main oxygen gas stream, and preferably over the entire length of the main oxygen gas stream.

Another use of the present coherent jet lance assembly would be to assist in slag skimming. While not essential to the practice of the presently disclosed systems and methods, slag skimming may be periodically desirable in order to prevent the accumulation of slag in the furnace and prevent build-up of accretions. In this step, the furnace is rotated about its longitudinal axis so that the slag may be removed through the mouth of the furnace. The coherent jet lance assembly is used to top blow the copper melt to raise a slag on the surface thereof and direct the slag in the direction of the furnace mouth.

After oxidation and optional slag skimming, the copper melt will typically contain about 3,000 to 7,000 ppm by weight of oxygen. In order to reduce the oxygen present in the melt to acceptable levels, the melt is then top blown by the same or different coherent jet lance assembly with a reducing gas, such as hydrogen, natural gas, a hydrocarbon, CO and ammonia, in order to deoxygenate the melt and reduce the oxygen present in the melt to a desired value.

Upon completion of the reduction steps, the resulting anode copper will typically contain about 15 ppm or less sulfur, 1,900 ppm or less oxygen and have a melt temperature in range of about 1200° C. At this point the anode copper is ready for casting into anodes for subsequent electrolytic refining. In order to provide heat to maintain the melt temperature as the copper melt exits the furnace ahead of the casting operation, the copper melt may again be top blown with a melting flame from the coherent jet lance assembly using a fuel-rich melting flame.

From the foregoing, it should be appreciated that the disclosed embodiments and examples provides various methods and systems of using coherent jet technology in a copper anode furnace including use of a coherent jet lance assembly for accretion prevention and removal. Although the invention has been described in detail with reference to certain preferred embodiments, as will occur to those skilled in the art, numerous other uses, modifications, changes, variations, additions and omissions can be made without departing from the spirit and scope of the instant claims.

What is claimed is:

1. A method for the removing solid accretions from a furnace comprising the steps of:
   (a) connecting or disposing at least one coherent jet lance assembly in the furnace, said coherent jet lance assembly being capable of generating a coherent oxygen-fuel gas stream substantially free of nitrogen gas, the coherent oxygen-fuel gas stream comprising a main oxygen gas stream and a surrounding flame envelope of fuel and oxygen gas; and
   (b) directing the coherent oxygen-fuel gas stream from said coherent jet lance assembly towards solid accretions at a firing rate of between about 4 million BTU/hour to about 15 million BTU/hour and with the main oxygen gas stream having an axial velocity of between about 75 to about 500 feet per second and wherein the flame length of the coherent oxygen-fuel gas stream is sufficient to melt solid accretions within the furnace yet does not impinge a refractory wall;
   (c) disconnecting or removing the coherent jet lance assembly from the anode furnace; and
   (d) rotating the anode furnace to remove any melted accretions from the anode furnace via a port.

2. The method for the removing solid accretions of claim 1 wherein the fuel rich, coherent oxygen fuel gas stream contains between about 5% to about 17% excess fuel.

3. The method for the removing solid accretions of claim 1 wherein the total oxygen gas flow delivered to the furnace via the coherent jet lance assembly is between about 6900 cubic feet per hour to about 30000 cubic feet per hour and wherein between about 70% to about 80% of the oxygen gas delivered to the furnace via the coherent jet lance assembly is in the main oxygen gas stream with the balance of oxygen gas in the flame envelope.

4. The method for the removing solid accretions of claim 1 wherein the ratio of oxygen to fuel delivered to the furnace is between about 1.7 to about 1.9.

5. The method for removing solid accretions of claim 1 wherein the port through which the melted accretions are removed is the furnace mouth.

6. The method for removing solid accretions of claim 1 wherein the port through which the melted accretions are removed is a tap port disposed in the furnace.

7. The method for removing solid accretions of claim 1 further comprising repeating steps (a) through (d) on an intermittent basis over extended periods of time.

8. The method for removing solid accretions of claim 1 wherein steps (a) through (d) are repeated between the operational steps of tapping of the molten copper from the furnace for casting and receiving new charges of copper within the furnace.

* * * * *